United States Patent [19]

Kwak

[11] Patent Number: 5,768,692
[45] Date of Patent: Jun. 16, 1998

[54] TRANSMISSION AND RECEPTION MATCHING METHOD FOR A CORDLESS COMMUNICATION APPARATUS AND APPARATUS THEREOF

[75] Inventor: Woo Young Kwak, Seoul, Rep. of Korea

[73] Assignee: LG Electronics Inc., Seoul, Rep. of Korea

[21] Appl. No.: 572,940

[22] Filed: Dec. 15, 1995

[30] Foreign Application Priority Data

Dec. 20, 1994 [KR] Rep. of Korea ............... 1994-35286

[51] Int. Cl.$^6$ ........................................... H04B 1/44
[52] U.S. Cl. ........................... 455/83; 455/84; 333/129; 333/23; 333/32
[58] Field of Search .................. 455/73, 78, 80, 455/82, 83, 84; 333/124–126, 129, 23, 32; 370/276, 278, 282, 293

[56] References Cited

U.S. PATENT DOCUMENTS

| | | |
|---|---|---|
| 3,979,292 | 9/1976 | Kuhn . |
| 4,615,800 | 10/1986 | Stifelman et al. . |
| 4,755,776 | 7/1988 | Preschutti . |
| 4,786,409 | 11/1988 | Miller . |
| 5,159,303 | 10/1992 | Flink . |
| 5,186,998 | 2/1993 | Eugster . |
| 5,207,903 | 5/1993 | Giberson . |
| 5,239,279 | 8/1993 | Turunen et al. . |
| 5,267,234 | 11/1993 | Harrison . |
| 5,442,812 | 8/1995 | Ishizaki et al. ............ 455/82 |

FOREIGN PATENT DOCUMENTS

| | | | |
|---|---|---|---|
| 59-214338 | 12/1984 | Japan ..................... | 455/78 |
| 61-214625 | 9/1986 | Japan ..................... | 455/83 |

OTHER PUBLICATIONS

"Microwave Engineers' Handbook", vol. 1, by Theodore S. Saad.
"Cellular Radio Systems", Mobile Communications Series, D.M. Balston and R.C.V. Macario.

*Primary Examiner*—Nguyen Vo
*Attorney, Agent, or Firm*—Jacobson, Price, Holman & Stern, PLLC

[57] ABSTRACT

A cordless communication apparatus which improves the performance of data transmission and reception by preventing the bandpass loss and the deterioration of frequency characteristics, which are caused during coupling a transmission output unit and reception input unit for using a single antenna. The apparatus minimizes power consumption, which is produced in using a λ/4 transmission path, thereby improving communication sensitivity. Also, since an expensive duplexer filter is not used, the manufacturing cost is reduced, thereby improving the price competitiveness of products.

6 Claims, 6 Drawing Sheets

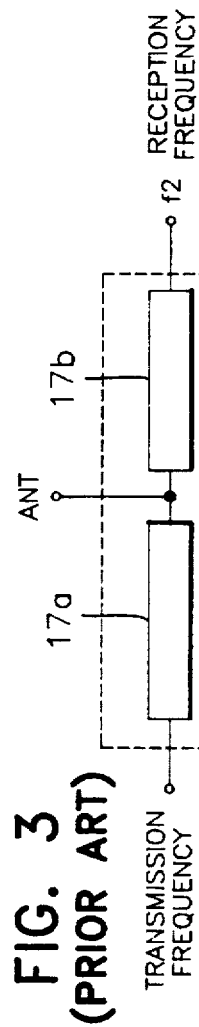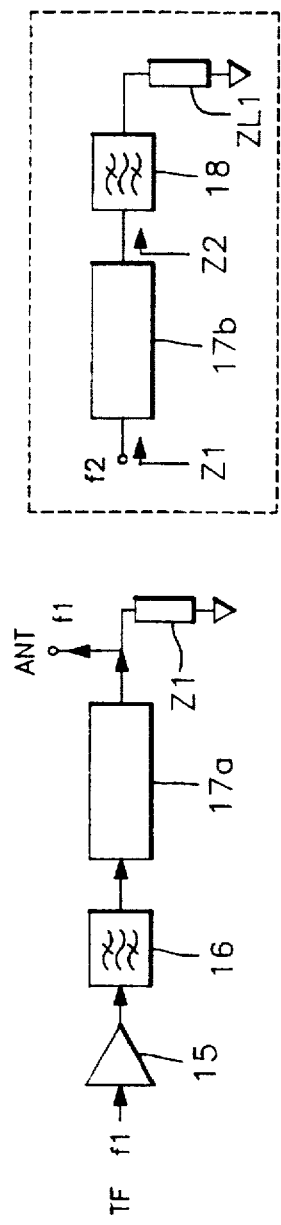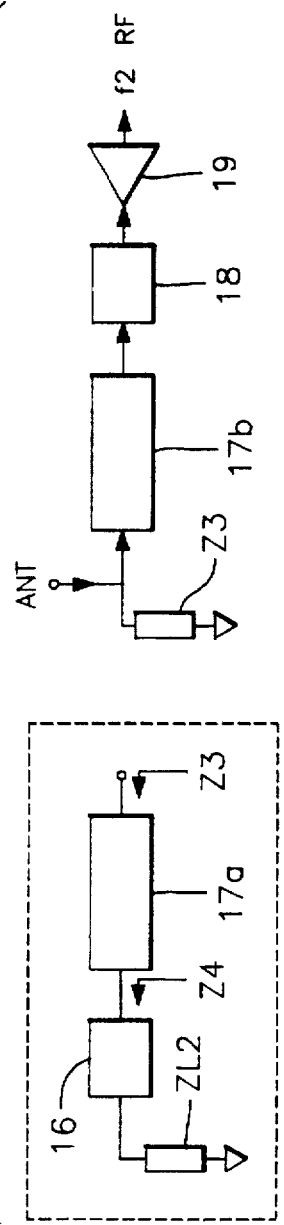
FIG. 3 (PRIOR ART)
FIG. 4 (PRIOR ART)
FIG. 5 (PRIOR ART)

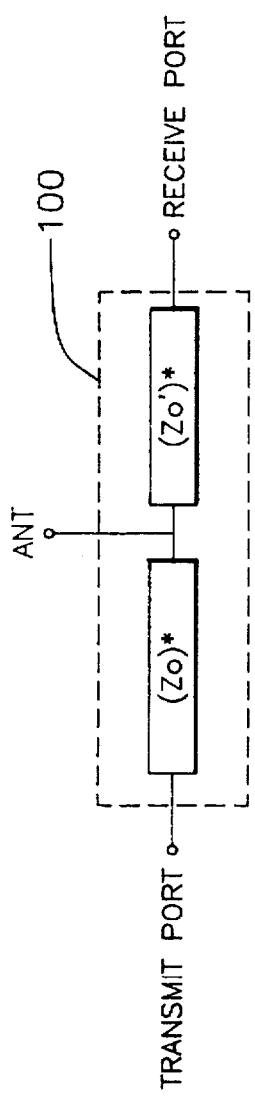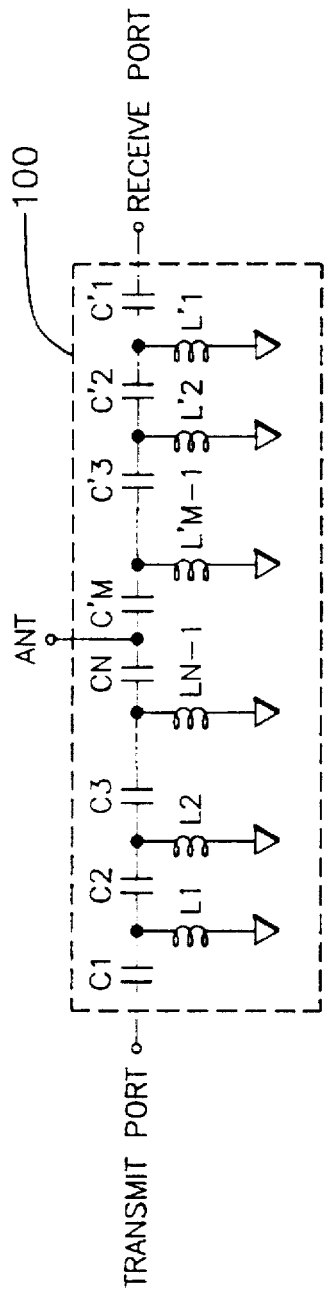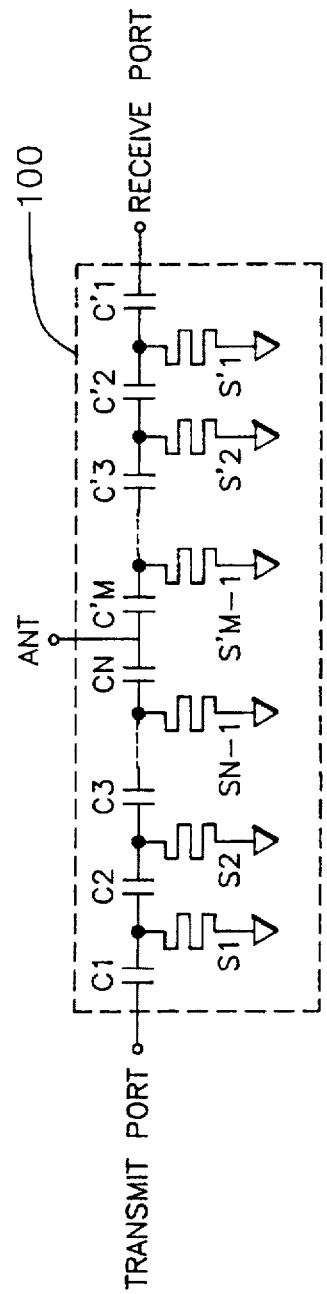

TRANSMISSION AND RECEPTION MATCHING METHOD FOR A CORDLESS COMMUNICATION APPARATUS AND APPARATUS THEREOF

BACKGROUND OF THE INVENTION

The present invention relates to a cordless communication apparatus adopting a full duplex method, and more particularly, to a transmission and reception matching method for a cordless communication apparatus which improves the performance of data transmission and reception by preventing the bandpass loss and the deterioration of frequency characteristics, which are caused during coupling a transmission output unit and reception input unit for using a single antenna, and the apparatus thereof.

A conventional cordless communication apparatus adopts a method for matching the output of a transmitter and the input of a receiver using a duplex filter, as shown in FIG. 1, and a method for matching the output of a transmitter and the input of a receiver using $\lambda/4$ matching circuit, as shown in FIG. 2.

In case of using duplex filter as shown in FIG. 1, a input reference band signal 1 for transmission is mixed with the output of a transmission local oscillator 3 in a mixer 2, and harmonic components generated in the mixing process are filtered in a bandpass filter 4. Here, only a transmission carrier frequency f1 is filtered, is power-amplified to a predetermined level via an output amplifier 5, and is output to antenna via an duplexer filter 6.

Also, the reception carrier frequency f2 applied from antenna is low-noise amplified in a reception low-noise amplifier 7 via duplexer filter 6. Then, only the signal of the reception band is filtered via a bandpass filter 8 to then be applied to a mixer 9. Mixer 9 mixes the filtered signal with the oscillated signal of reception local oscillator 10 to generate a first intermediate frequency (IF).

As described above, the method for coupling transmitter and receiver using duplexer filter is typically adopted. However, since the duplexer filter is expensive, the manufacturing cost becomes higher, which causes the price rise of the products.

Also, without using duplexer filter for matching the transmitter and receiver unlike the case in FIG. 1, a bandpass filter 16 is adopted to a transmission output port and another bandpass filter 18 is adopted to a reception output port to then couple the transmission output port and reception output port by $\lambda/4$ matching circuit 17, as shown in FIG. 2. At this time, $\lambda/4$ matching circuit 17 is constituted by two transmission paths 17a and 17b having a predetermined length, as shown in FIG. 3. Assuming that a transmission frequency is f1 and its wavelength is $\lambda 1$, and a reception frequency is f2 and its wavelength is $\lambda 2$, the electrical length L1 of transmission path 17a for performing a transmission is $\lambda \cdot 2/4$, and the electrical length L2 of reception path 17b for performing a reception is $\lambda \cdot 1/4$.

Like this manner, equivalent input impedance Z1 for transmission frequency f1 with respect to reception path is unnecessarily loaded on the transmission path connected to antenna via output amplifier 15, bandpass filter 16 and transmission path 17a, in case of adopting the method for coupling transmitter and receiver using duplexer filter, as shown in FIG. 4 which is a transmission path equivalent diagram. If the impedance Z1 is not considerably larger than a nominal impedance Z0 of transmission path, a transmission signal is attenuated by the impedance Z1.

Also, equivalent input impedance Z3 for reception frequency f2 with respect to transmission path is unnecessarily loaded on the reception path connected to antenna, transmission path 17b, bandpass filter 18 and low-noise amplifier 19, when the reception carrier frequency on the reception path is f2, as shown in FIG. 5. If the impedance Z3 is not considerably larger than a nominal impedance Z0 of reception path, a reception signal is attenuated by the impedance Z3.

As described above, an example of an attenuated transmission signal will now be described with reference to FIGS. 6 and 7.

FIG. 6 is a Smith chart of impedance data for a bandpass filter whose transmission center frequency is 914.5 MHz. The impedance of a mark 2 (M2) corresponds to Z2 in FIG. 4, and its value is 0.08+j·0.5. The value of impedance Z1 is 0.312+j·1.95 via transmission path 17b in FIG. 4, which is non-normalized into 50 ohm system to then become 15.6+j·97.5 ohms. If Z1 which is a complex impedance is connected to transmission path 17a by a unnecessary load, the transmission path loss between antenna and transmission path 17a becomes 1.85 dB at 914.5 MHz, thereby unnecessarily attenuating transmission power, which lowers the performance of the equipment.

Also, FIG. 7 is a Smith chart of impedance for bandpass filter whose reception center frequency is 959.5 MHz. The impedance of a mark 1 (M1) corresponds to Z4 in FIG. 5, and its value is 0.15+j·1.1. The value of impedance Z3 is 0.1217+j·0.8925 via transmission path 17a in FIG. 5, which is non-normalized into 50 ohm system to then become 6.085+j·44.625 ohms. If Z3 which is a complex impedance is connected to transmission path 17b by a unnecessary load, the reception path loss between antenna and transmission path 17b becomes 0.72 dB at 959.5 MHz, thereby unnecessarily attenuating reception power, which lowers the reception sensitivity.

As described above, according to the method for coupling transmitter and receiver using $\lambda/4$ matching circuit, unnecessary load impedance of a low value is generated at transmission and reception ports depending on the impedance characteristics of bandpass filter positioned on transmission and reception ports, thereby decreasing the transmission outputs and lowering the reception sensitivity. In order to increase the unnecessary load impedance of a low value, a transmission path having a length longer than $\lambda/4$ may be used, which causes an path length increase to then make the communication system large. This involves a problem in a practical manufacturing process.

SUMMARY OF THE INVENTION

To solve the above problems, it is an object of the present invention to provide a cordless communication apparatus which improves the performance of data transmission and reception by minimizing the unnecessary path loss generated during a frequency transmission and reception coupling by coupling a transmitter and a receiver by means of a matching circuit using a quasi-inverse transmission line, and reduces the manufacturing cost by using cheap devices to increase the price competitiveness. To accomplish the above object, there is provided a transmission and reception matching method for a cordless communication apparatus, including matching an output port transmission path of a transmitter which is connected to an end of an antenna with an input port reception path of a receiver which is also connected to an end of the antenna by a quasi-inverse transmission line, thereby minimizing the loss of transmitted and received signals.

Also, there is provided a transmission and reception matching apparatus for a cordless communication apparatus including an output port transmission path of a transmitter including a plurality of capacitances and a plurality of inductances, whereby the plurality of capacitances and the plurality of inductances are connected to each other in parallel; an input port reception path of a receiver including a plurality of capacitances and a plurality of inductances, whereby the plurality of capacitances and the plurality of inductances are connected to each other in parallel; and an antenna having and end, the end of the antenna being connected to the output port transmission path of a transmitter and the input port reception path of the receiver.

Also, there is provided a transmission and reception matching apparatus for a cordless communication apparatus including an output port transmission path of a transmitter including a plurality of capacitances and a plurality of inductances, whereby the plurality of capacitances and the plurality of inductances are connected to each other in parallel; and input port reception path of a receiver including a plurality of capacitances and a plurality of inductances, whereby the plurality of capacitances and the plurality of inductances are connected to each other in parallel; and an antenna having an end, the end of the antenna being connected to the output port transmission path of a transmitter and the input port reception path of the receiver, whereby the output port transmission path of a transmitter and the input port reception path of a receiver are reverse-phased and are matched using a quasi-inverse transmission line.

BRIEF DESCRIPTION OF THE DRAWINGS

The above objects and advantages of the present invention will become more apparent by describing in detail a preferred embodiment thereof with reference to the attached drawings in which:

FIG. 3 is a schematic diagram of $\lambda/4$ transmission path matching circuit shown in FIG. 2;

FIG. 4 is a transmission path equivalent circuit diagram of $\lambda/4$ transmission path matching circuit shown in FIG. 2;

FIG. 5 is a reception path equivalent circuit diagram of $\lambda/4$ reception path matching circuit shown in FIG. 2;

FIG. 8 is a schematic diagram of a quasi-inverse transmission line according to the present invention;

FIG. 9 is an equivalent circuit diagram of quasi-inverse transmission line using inductances and capacitors according to the present invention;

FIG. 10 is an equivalent circuit diagram of quasi-inverse transmission line using capacitors and short stubs according to the present invention;

DETAILED DESCRIPTION OF THE INVENTION

As shown in FIG. 8, [Zo]* represents a transmission path present in the transmission path which rotates counterclockwise as long as the electrical length of a quasi-inverse transmission line, and [Zo']* represents a transmission path present in the reception path.

As shown in FIG. 9, transmission path [Zo]* is constituted by a plurality of series capacitors C1, C2, . . . , Cn and a plurality of parallel inductances L1, L2, . . . , Ln−1. Reception path [Zo']* is constituted by capacitors CM', . . . , C2', C1' and inductances LM−1', . . . , L2', L1'. At this time, capacitors and inductances are parallel connected, and transmission path [Zo]* and reception path [Zo']* are reverse-phased.

Also, as shown in FIG. 10, a short stub S may be used instead of an inductance L of FIG. 9. Inductance L and short stub S may be mixed for use.

Figure 1:
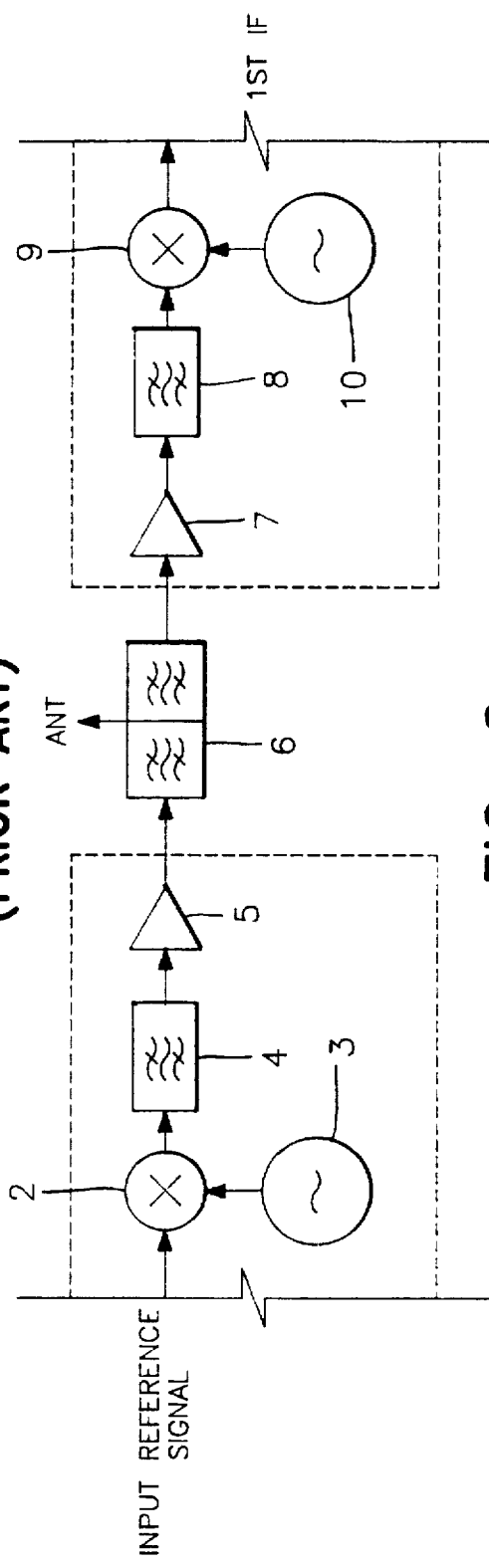
FIG. 1 is a schematic diagram of a transmitting and receiving apparatus using a conventional duplex filter.
Figure 2:
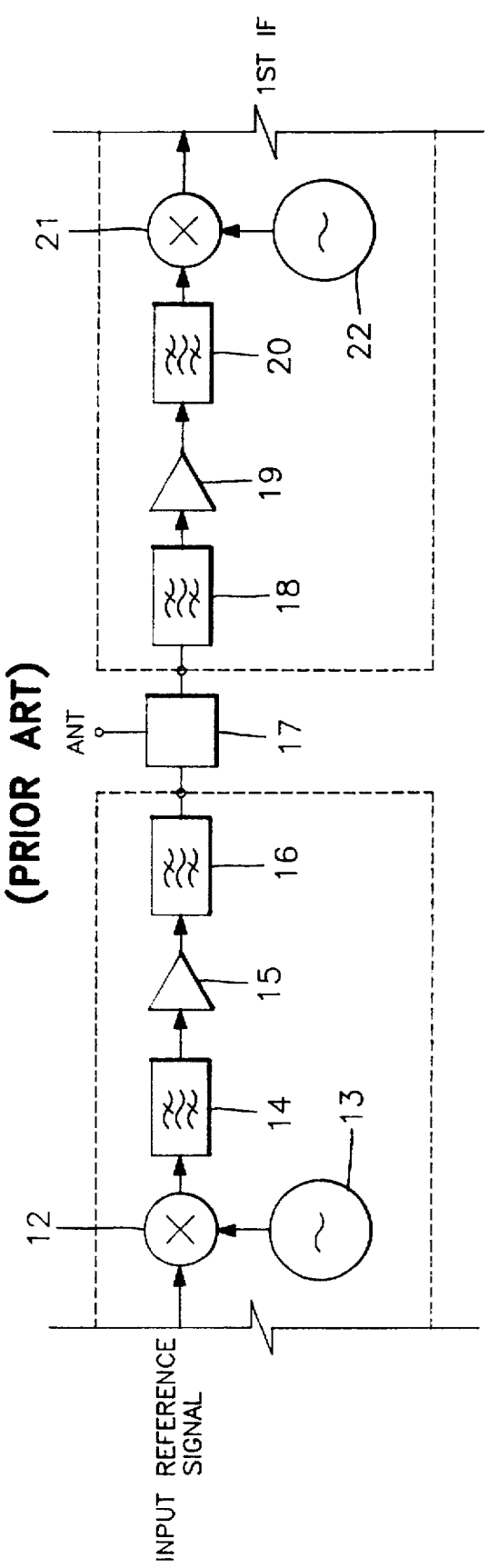
FIG. 2 is a schematic diagram of a transmitting and receiving apparatus using a conventional $\lambda/4$ transmission path matching circuit.
Figure 6:
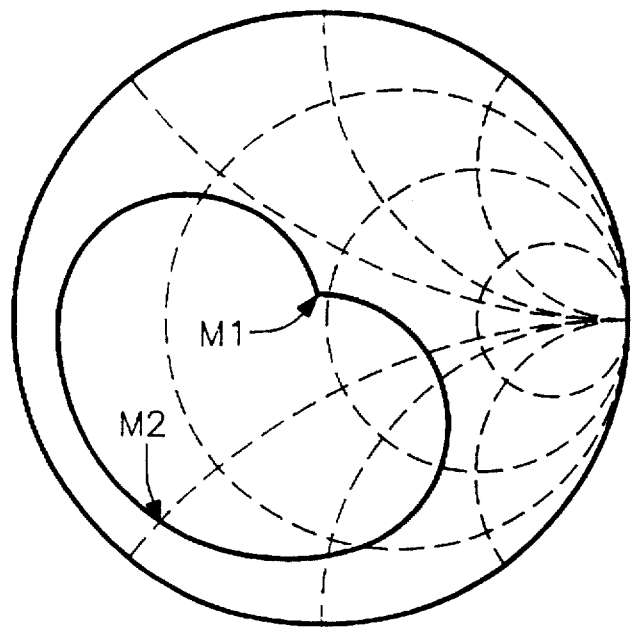
FIG. 6 is a Smith chart of impedance data for a bandpass filter whose center frequency is 914.5 MHz.
Figure 7:
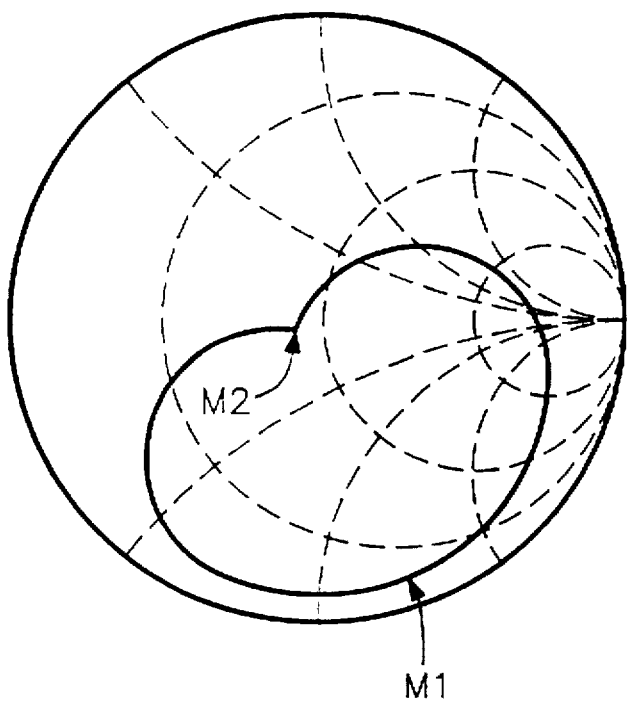
FIG. 7 is a Smith chart of impedance data for a bandpass filter whose center frequency is 959.5 MHz.
Figure 11:
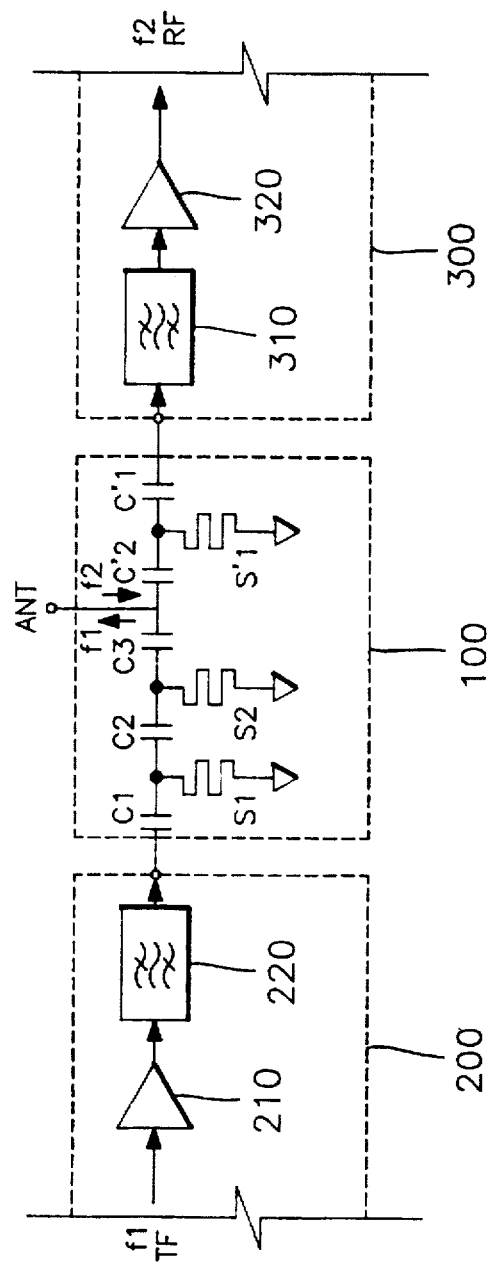
FIG. 11 shows an example of a transmission and reception matching composition using quasi-inverse transmission line according to the present invention.

The transmission and reception matching using quasi-inverse transmission line will now be described with reference to FIG. 11.

A transmission carrier frequency f1 applied to a transmission output amplifier 210 is amplified as a necessary power, whose unnecessary harmonic components are removed in a bandpass filter 220, and then is applied to a quasi-inverse transmission line 100 to then be output via a matching circuit on a transmission path constituted by capacitors C1, C2 and C3, and short stubs S1 and S2. A reception carrier frequency f2 applied from an antenna is low-noise amplified in a reception low-noise amplifier 320 to then be output, after only the signals of a necessary reception band is filtered in a bandpass filter 310 via matching circuit on a reception path constituted by capacitors C2' and C1', and a short stub S1' of quasi-inverse transmission line 100.

Figure 12:
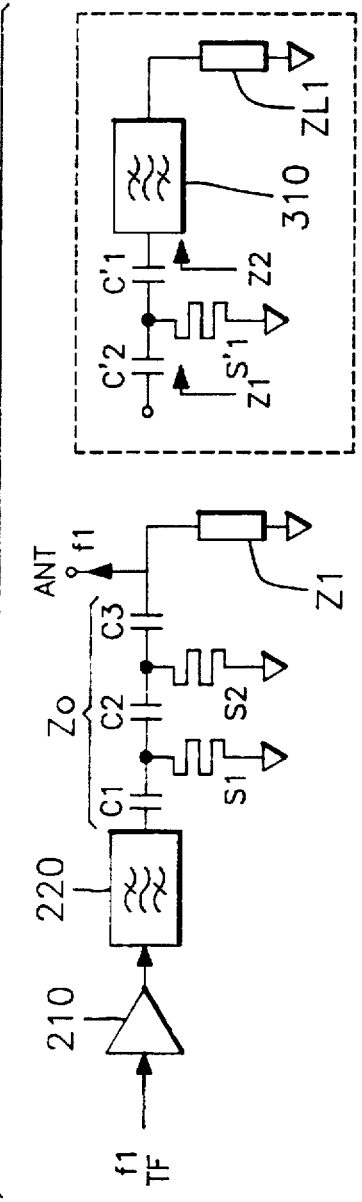
FIG. 12 is a transmission path equivalent circuit diagram of quasi-inverse transmission line according to the present invention.

With reference to FIG. 12, the operation of transmission path will now be described.

If the transmission carrier frequency is f1, equivalent input impedance Z1 for transmission carrier frequency f1 with respect to reception path is unnecessarily loaded to transmission path connected to antenna via an output amplifier 210, bandpass filter 220, quasi-inverse transmission line constituted by capacitors C1, C2, . . . , Cn and short stubs S1 and S2. Here, since the impedance Z1 is changed into a very larger value than a nominal impedance Z0 of transmission path by capacitors C2' and C1', and a short stub S1', a transmission signal is very slightly attenuated by Z1, thereby transmitting a desired transmission power via antenna.

Figure 13:
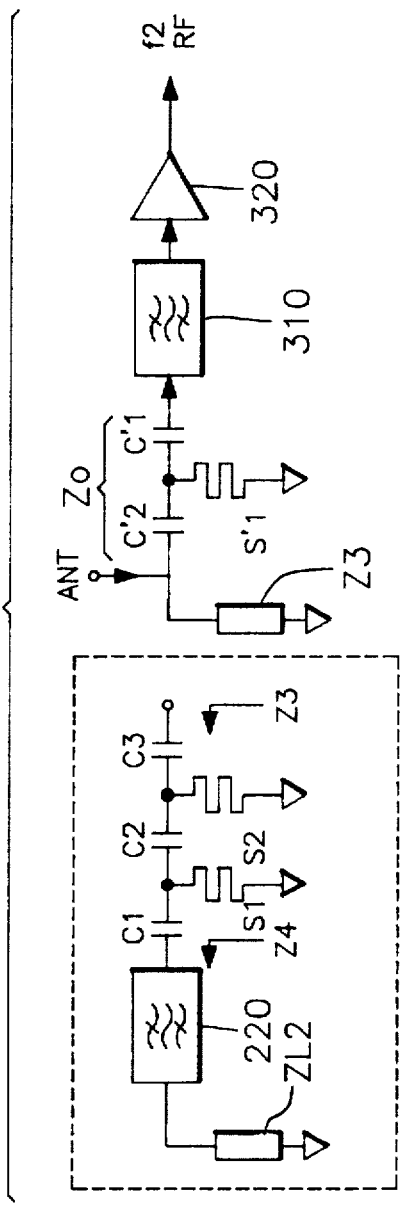
FIG. 13 is a reception path equivalent circuit diagram of quasi-inverse transmission line according to the present invention.

Also, in the reception path shown in FIG. 13, if the reception carrier frequency is f2, only the signals of a reception band are filtered in bandpass filter 310 via quasi-inverse transmission line constituted by capacitors C2' and C1' and a short stub S1', and is low-noise amplified by a reception low-noise amplifier 320, to then be output to a next stage. Equivalent input impedance Z3 is connected to reception path by an unnecessary load for reception carrier frequency f2 with respect to reception path. Since the impedance Z3 is changed into a very larger value than a nominal impedance Z0 of reception path by capacitors C1, C2, . . . , Cn and short stubs S1 and S2, reception signal is very slightly attenuated by Z3, thereby obtaining a desired reception sensitivity in receiver.

As described above, the present invention receives a desired signal by minimizing unnecessary power loss of transmitter and receiver, which is produced in using a $\lambda/4$ transmission path, thereby improving communication sensitivity. Also, since an expensive duplexer filter is not used, the manufacturing cost is reduced, thereby improving the reliability in price competitiveness of products.

What is claimed is:

1. A transmission and reception matching method for a cordless communication apparatus, comprising matching an output port transmission path of a transmitter which is connected to an end of an antenna with an input port reception path of a receiver which is also connected to the antenna by a Quasi-Inverse transmission line which includes a plurality of series capacitors and a plurality of parallel inductors, wherein the inductors using lumped type inductors or distributed type short stubs can be used, thereby minimizing the loss of transmitted and received signals, and wherein the transmission path is rotated counterclockwise by electrical length of the quasi-inverse transmission line.

2. A transmission and reception matching method for a cordless communication apparatus as claimed in claim 1, wherein said quasi-inverse transmission line makes unnecessary load impedance value present in a transmission path and reception path a very larger value than a nominal impedance value of each path.

3. A transmission and reception matching apparatus for a cordless communication apparatus comprising:

an output port transmission path of a transmitter including a plurality of series capacitors and a plurality of parallel inductances, whereby the plurality of capacitors and the plurality of inductances are connected to each other in parallel;

an input port reception path of a receiver including a plurality of series capacitors and a plurality of parallel inductances, whereby the plurality of capacitances and the plurality of inductances are connected to each other in parallel; and an antenna having an end, the end of said antenna being connected to the output port transmission path of a transmitter and the input port reception path of a receiver, whereby said output port transmission path of a transmitter and said input port reception path of a receiver are reverse-phased and are matched using a a quasi-inverse transmission line by rotating counter-clockwise the transmission path by electrical length of the quasi-inverse transmission line.

4. A transmission and reception matching apparatus for a cordless communication apparatus as claimed in claim 3, wherein a predetermined number of capacitors and a predetermined number of stubs are connected to said transmission path and said reception path.

5. A transmission and reception matching apparatus for a cordless communication apparatus as claimed in claim 4, wherein said plurality of inductances and stubs are mixed for use in said transmission path and said reception path.

6. A transmission and reception matching apparatus for a cordless communication apparatus as claimed in claim 3, wherein said plurality of capacitors used in said transmission path and said reception path are implemented by being filtered through a distribution function.

* * * * *